United States Patent
Sakabe (10) Patent No.: US 10,261,174 B2
(45) Date of Patent: Apr. 16, 2019

(54) LASER RADAR DEVICE

(71) Applicant: DENSO WAVE INCORPORATED, Chita-gun, Aichi-pref. (JP)

(72) Inventor: Kouji Sakabe, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 177 days.

(21) Appl. No.: 15/115,858

(22) PCT Filed: Feb. 2, 2015

(86) PCT No.: PCT/JP2015/052848
§ 371 (c)(1),
(2) Date: Aug. 1, 2016

(87) PCT Pub. No.: WO2015/115643
PCT Pub. Date: Aug. 6, 2015

(65) Prior Publication Data
US 2017/0168145 A1    Jun. 15, 2017

(30) Foreign Application Priority Data

Jan. 31, 2014 (JP) ................................. 2014-016301

(51) Int. Cl.
*G01C 3/08* (2006.01)
*G01S 7/481* (2006.01)
(Continued)

(52) U.S. Cl.
CPC ............ *G01S 7/4817* (2013.01); *G01S 17/42* (2013.01); *G02B 19/0085* (2013.01); *G02B 26/105* (2013.01)

(58) Field of Classification Search
CPC ...... G01S 7/4817; G01S 17/42; G02B 26/105
(Continued)

(56) References Cited

U.S. PATENT DOCUMENTS 6,011,613 A   1/2000   Ohtomo et al.
6,075,586 A   6/2000   Ohtomo et al.
(Continued)

FOREIGN PATENT DOCUMENTS

JP   H09-204583 A   8/1997
JP   2789741 B2     8/1998
(Continued)

OTHER PUBLICATIONS

Apr. 21, 2015 International Search Report issued in Japanese Patent Application No. PCT/JP2015/052848.

*Primary Examiner* — Mark Hellner
(74) *Attorney, Agent, or Firm* — Oliff PLC (57) ABSTRACT

A laser radar device includes a laser diode and a photodiode. An optical isolator is disposed so as to tilt with respect to the optical axis of a laser beam by a predetermined angle, transmits a laser beam, and reflects reflected light toward the photodiode. A reflecting mirror is rotatably disposed around a center axis extending along the optical axis of the transmitted laser beam. A rotatable deflector, rotated by a motor, deflects a laser beam by the reflecting mirror toward the external space, and reflects reflected light from an object toward the optical isolator. When the side where the laser diode is disposed in the center axis direction is defined as the first side and the side opposite to the first side is defined as the second side, the motor is disposed at a position closer to the first side than the reflecting mirror.

9 Claims, 7 Drawing Sheets

(51) Int. Cl.
  *G01S 17/42*  (2006.01)
  *G02B 26/10*  (2006.01)
  *G02B 19/00*  (2006.01)

(58) Field of Classification Search
  USPC .................................................... 356/5.01
  See application file for complete search history.

(56) References Cited

U.S. PATENT DOCUMENTS

| | | |
|---|---|---|
| 6,249,338 B1 | 6/2001 | Ohtomo et al. |
| 6,314,651 B1 * | 11/2001 | Ohtomo ............... G01C 15/004 33/285 |
| 8,310,585 B2 * | 11/2012 | Lee ....................... G01S 7/4802 342/118 |
| 2008/0316463 A1 | 12/2008 | Okada et al. |
| 2010/0073749 A1 | 3/2010 | Noh et al. |
| 2010/0149407 A1 | 6/2010 | Lee et al. |
| 2012/0057021 A1 | 3/2012 | Kumagai et al. |

FOREIGN PATENT DOCUMENTS

| | | |
|---|---|---|
| JP | 2000-213937 A | 8/2000 |
| JP | 2013-205353 A | 10/2013 |

* cited by examiner

PARTIAL CROSS-SECTIONAL PLAN VIEW

— 1 —
LASER RADAR DEVICE

CROSS-REFERENCE TO RELATED APPLICATION

This application is based on and claims the benefit of priority from earlier Japanese Patent Application No. 2014-016301 filed Jan. 31, 2014, the description of which is incorporated herein by reference.

BACKGROUND

Technical Field

The present invention relates to a laser radar device which scans its surroundings so as to acquire information for measuring an azimuth of an object existing in the surrounding space and/or a distance to the object.

Background Art

In recent years, a laser beam is often used for a technology to measure an azimuth of an object and a distance to the object, which is a detection target and exists in the surrounding space. Such a technology is provided as a laser radar device illustrated in FIG. 1, as shown in, e.g., PTLs 1 and 2. In this laser radar device 900, an optical isolator 930 is provided on the optical axis of a laser beam outputted from a laser diode 910. The optical isolator 930 transmits a laser beam and reflects the reflected light from the detected object toward the photodiode 92.

Figure 1:
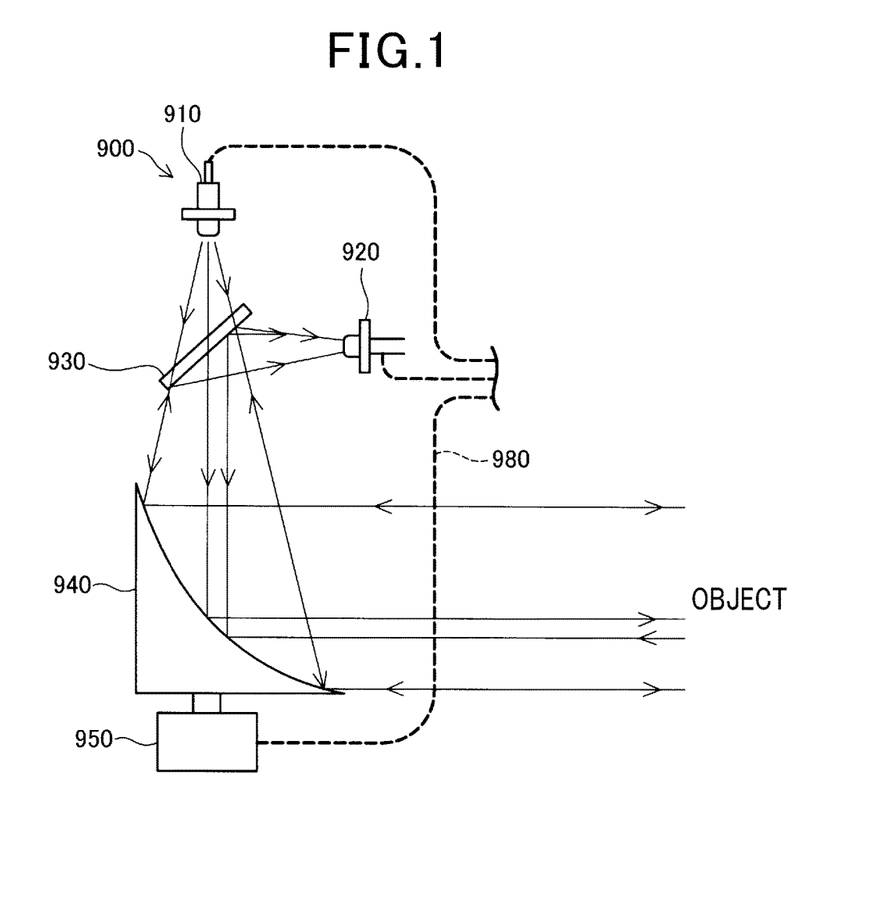
FIG. 1 is a schematic diagram of a conventional laser radar device for illustrating a problem in the conventional technology.

Further, a concave mirror 940 configured to rotate about the central axis along the optical axis of the laser beam transmitted through the optical isolator 930 is provided on this optical axis. This concave mirror 940 reflects the laser beam toward an external space and reflects the reflected light from a detected object existing in the external space, which enables horizontal scanning in the rotational direction.

The concave mirror 940 is rotationally driven by the motor 950. When the laser diode 910 is disposed at the upper side and the concave mirror 940 is disposed at the lower side as shown in FIG. 1, the motor 950 is connected to the bottom side of the concave mirror 940.

CITATION LIST

Patent Literature

[PTL 1]
Japanese Patent No. 2789741
[PTL 2]
Japanese Unexamined Patent Application Publication No. 2008-216238

Technical Problem

In order to electrically connect the motor 950 to the laser diode 910 and/or the photodiode 920 by using wiring 980 in a conventional laser radar device configured as described above, it is unavoidable that the wiring 980 blocks light outputted from the concave mirror 940 toward the external space. This is because the motor 95 is provided below the concave mirror 940 in a conventional laser radar configured as described above. For the same reason as above, in order to physically connect the motor 950 to the laser diode 910 and/or the photodiode 920 by using a non-illustrated frame structure for disposing each component, it is unavoidable that the frame structure blocks light outputted from the concave mirror 940 toward the external space. Thus, a conventional laser radar device has a problem that it cannot fully scan its surrounding over all the azimuths of 360 degrees.

SUMMARY

Thus it is desired to be worked out in order to solve at least a part of the above-described problem and can be realized as each of the following aspects.

One aspect of the present disclosure is a laser radar device. This laser radar device includes a laser-beam generator, a laser-beam detector, a transmission/reflection structure, a rotatable deflector, and a driver. The laser-beam generator generates a laser beam. The laser-beam detector detects reflected light of the laser beam reflected by an object when the laser beam is outputted from the laser-beam generator. The transmission/reflection structure is disposed on an optical axis of the laser beam so as to tilt with respect to the optical axis of the laser beam by a predetermined angle, transmits the laser beam, and reflects the reflected light toward the laser-beam detector. The rotatable deflector includes an optical path through which the laser beam and the reflected light are transmitted, and a deflecting surface rotatably disposed around a center axis extending along the optical axis of the laser beam having been transmitted. Additionally, the rotatable deflector deflects the laser beam, which is made incident on the deflecting surface after being transmitted through the optical path, toward the external space. Further, the rotatable deflector deflects the reflected light, which is returned to the deflecting surface from the external space, toward the transmission/reflection structure through the optical path. The driver drives the rotatable deflector. In the above-described configuration, when the side where the laser-beam generator is disposed in the direction of the center axis is defined as the first side and the side opposite to the first side is defined as the second side, the driver is disposed at a position closer to the first side than the deflecting surface.

According to the laser radar device of the above-described aspect, the driver is disposed closer to the first side than the deflecting surface. Hence, when the driver is electrically connected to the laser-beam generator and the laser-beam detector by wiring, the wiring never blocks light outputted from the deflecting surface toward external space. Similarly, when the driver is physically connected to the laser-beam generator and the laser-beam detector by a frame structure for disposing each component, the frame structure never blocks light outputted from the deflecting surface. Thus, the laser radar device of the above-described aspect can scan its surroundings over all the azimuths of 360 degrees.

The rotatable deflector of the laser radar device of the above-described aspect may include a cylindrical structure as described below and a transmitter configured to be disposed around a side surface of the cylindrical structure and to transmit driving force of the driver to the cylindrical structure. The inside of the cylindrical structure is formed as a hollow cavity functioning as the optical path. The cylindrical structure includes a deflector equipped with the above-described deflecting surface and is disposed so that the center axis of the cavity matches the optical axis of the laser beam and the deflecting surface is positioned at a cylindrical opening on the second side of the cylindrical structure.

According to such a configuration, the cylindrical structure can be disposed at a position closer to the first side than the deflecting surface by transmitting a laser beam through the inside of the cylindrical structure. Thus, the driver can be connected from the first side to the rotatable deflector only by a simple configuration of further providing the cylindrical structure and the transmitter.

The laser radar device of the above-described aspect may further include a controller which is electrically connected to the laser-beam generator, the laser-beam detector, and the driver by wiring and controls operations of the laser-beam generator, the laser-beam detector, and the driver. Also in such a configuration, the wiring never blocks a laser beam for scanning and thus scanning over all the azimuths of 360 degrees can be achieved.

In the laser radar device of the above-described aspect, the rotatable deflector and the driver may further configured as follows. The rotatable deflector may be disposed so that the deflecting surface can rotate not only around the center axis but also in an elevating-angle direction with reference to a plane perpendicular to the center axis. The driver may be configured to drive the rotatable deflector to not only rotate around the center axis but also rotate in the elevating-angle direction. According to such a configuration, a wide irradiation range can be achieved also in the direction of the center axis, and thereby security performance can be improved.

The rotatable deflector of the laser radar device of the above-described aspect may include a cylindrical structure, a first transmitter, a rotational-direction converter, and a second transmitter configured as follows. The inside of the cylindrical structure is formed as a hollow cavity functioning as the optical path, and the cylindrical structure includes a deflector equipped with the above-described deflecting surface. Further, the cylindrical structure is disposed so that the center axis of the cavity (i.e., the cylindrical axis of the cylindrical structure) matches the optical axis of the laser beam and the deflecting surface is positioned at a cylindrical opening on the second side of the cylindrical structure. The first transmitter is disposed around the side surface of the cylindrical structure and transmits driving force of the driver as torque around the center axis of the cylindrical structure. The rotational-direction converter converts the driving force of the driver into torque around an axis perpendicular to the cylindrical axis in conjunction with the first transmitter. The second transmitter converts the torque converted by the rotational-direction converter into force in the direction of the center axis and transmits the force in the direction of the center axis to the deflecting surface. According to such a configuration, rotation of the deflecting surface in the elevating-angle direction as well as rotation of the deflecting surface around the center axis can be achieved by a simple configuration.

Note that the present disclosure can be embodied in a variety of aspects. For instance, the present invention can be embodied as a laser radar system equipped with the laser radar device of the above-described aspect.

DESCRIPTION OF EMBODIMENTS

Next, various embodiments of laser radar devices of the present invention will be described with reference to the accompanying drawings.

First Embodiment

The laser radar device 1 according to the first embodiment of the present invention will be described with reference to FIG. 2 to FIG. 4.

Figure 2:
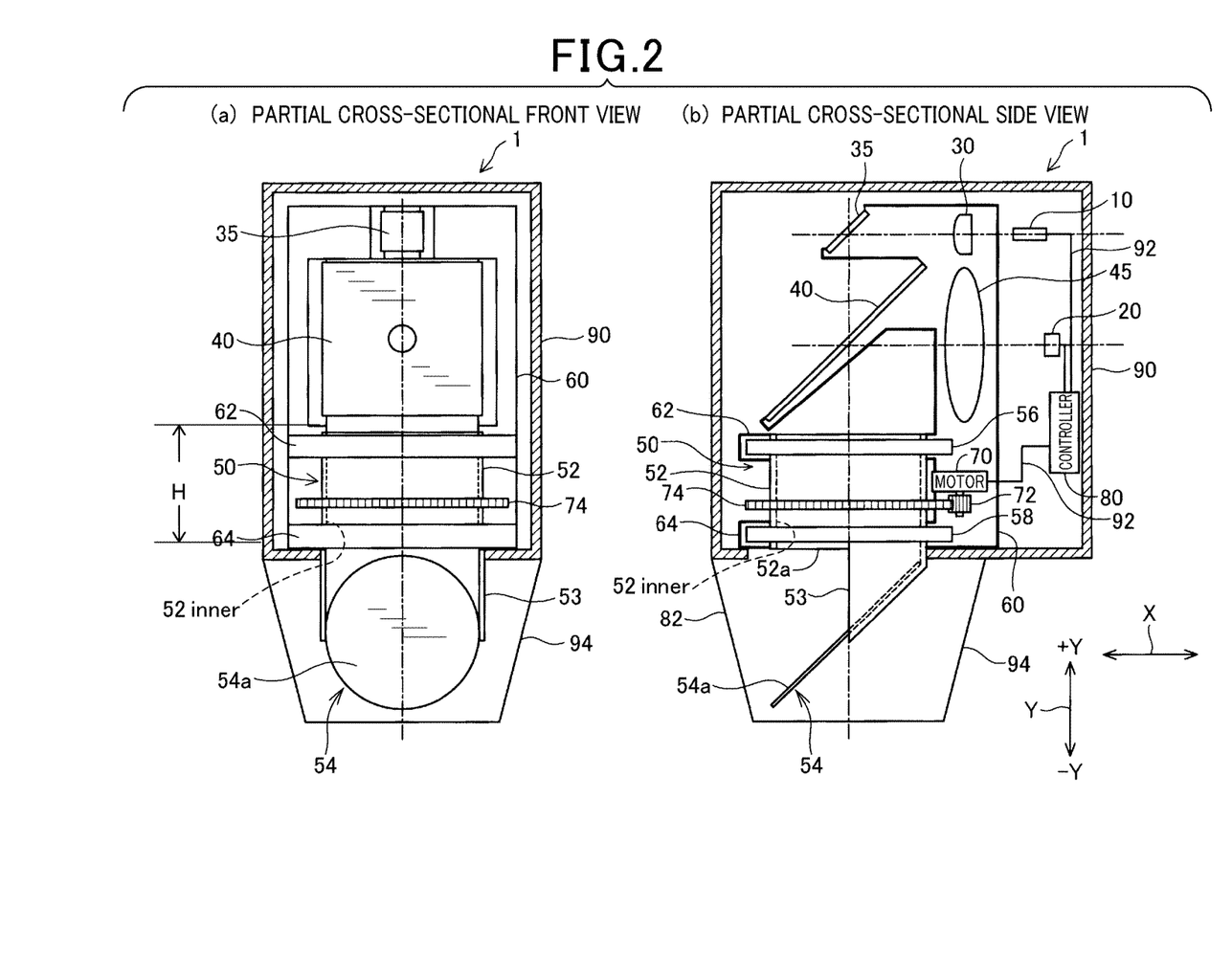
FIG. 2 is a partial cross-sectional diagram illustrating the laser radar device according to the first embodiment of the present invention.

FIG. 2(*a*) is a partial cross-sectional front view of the laser radar device 1, and FIG. 2(*b*) is a partial cross-sectional side view of the laser radar device 1.

Figure 3:
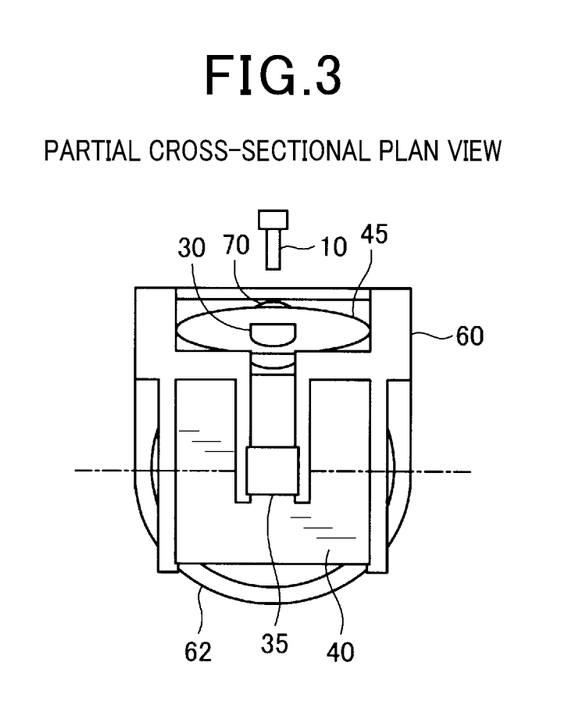
FIG. 3 is a partial cross-sectional plan view of the laser radar device according to the first embodiment of the present invention.

FIG. 3 is a partial cross-sectional plan view of the laser radar device 1.

Figure 4:
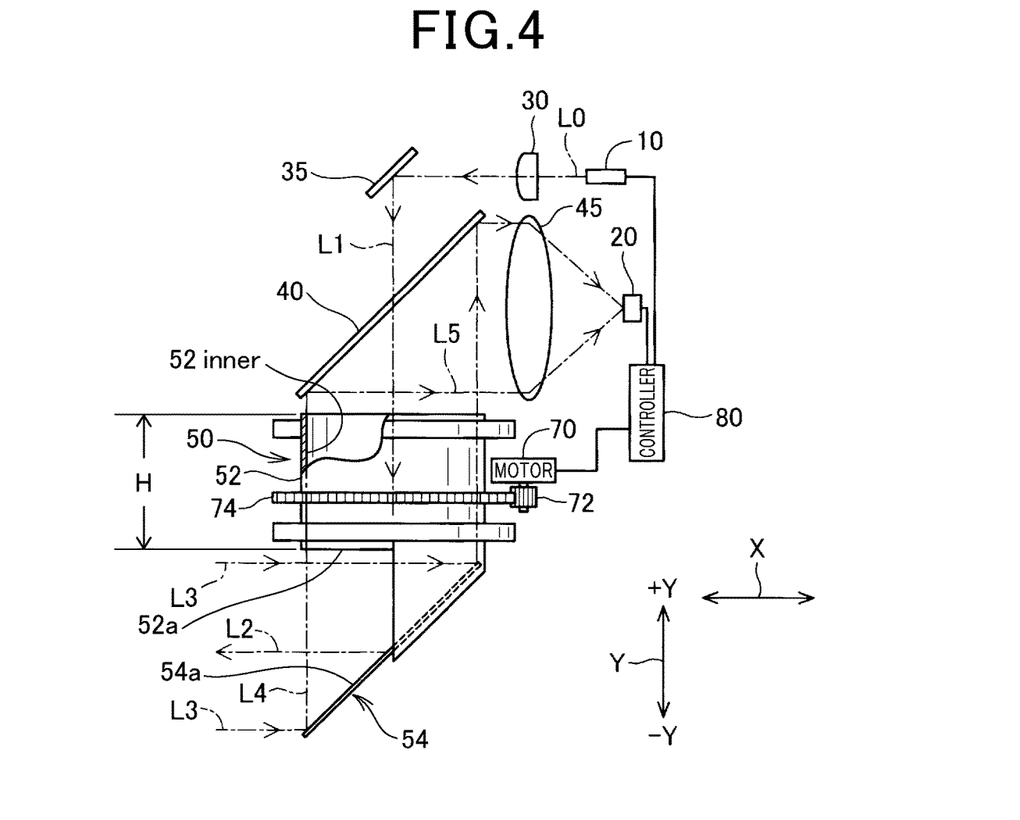
FIG. 4 is a schematic diagram illustrating an optical path of a laser beam of the laser radar device of the first embodiment.

FIG. 4 is a schematic diagram illustrating an optical path of a laser beam of the laser radar device 1.

As shown in FIG. 2(*a*) and FIG. 2(*b*), the laser radar device 1 includes a laser diode 10 and a photodiode 20 configured to receive reflected light L3 (FIG. 4) from an object to be detected. The laser radar device 1 is configured as a device for measuring a distance to an object to be detected and its azimuth. The laser diode 10 is an example of the laser-beam generator. The laser diode 10 is supplied with pulse electric current from the controller 80 and projects a pulse laser beam (L0 in FIG. 4). The photodiode 20 is an example of the laser-beam detector. When a laser beam L0 is outputted from the laser diode 10, the photodiode 20 detects reflected light L3 of a laser beam L0 reflected by an object to be detected, and converts the detected reflected light L3 into an electric signal.

A lens 30 and a mirror 35 are provided on the optical axis of the laser beam L0. The lens 30 is configured as a collimating lens, and converts the laser beam L0 outputted from the laser diode 10 into parallel light. In the present embodiment, the laser radar device 1 is installed so that the optical axis direction of the laser beam L0 matches the horizontal direction X. The mirror 35 reflects the incident laser beam L0 in the horizontal direction X toward the lower side (−Y) in the vertical direction Y. The laser beam after this reflection is indicated by the reference sign L1 in FIG. 4. The laser beam L1 is made incident on an optical isolator 40.

The optical isolator 40 is disposed so as to tilt with respect to the optical axis of the laser beam L1 by a predetermined angle (e.g., 45 degrees), and disperses a laser beam based on deflection characteristics of light. A condenser lens 45 is disposed between the optical isolator 40 and the photodiode 20.

As shown in FIG. 4, the optical isolator 40 transmits the incident laser beam L1 from the upper side (+Y) in the vertical direction. Further, the optical isolator 40 reflects the reflected light L4, which is originally the reflected light L3 and has been made incident on the optical isolator 40 from the lower side (−Y) in the vertical direction, toward the photodiode 20. Then, the reflected light L5, which is parallel light of the reflected light L4 after being reflected by the optical isolator 40, is condensed by the condenser lens 45 so as to be made incident on the photodiode 20.

The optical isolator 40 is an example of the transmission/reflection structure, and can be replaced by another configuration as long as it has both functions of transmitting and reflecting a laser beam. For instance, the laser radar device 1 may be configured so that a penetrating path through which the laser beam L1 is transmitted is formed on a reflective surface and the reflected light L3 is reflected by this reflective surface.

A rotatable deflection structure 50 is provided on the optical axis of the laser beam L1 transmitted through the optical isolator 40.

As shown in FIG. 3 and FIG. 4, the rotatable deflection structure 50 includes a cylindrical structure 52 having a predetermined height H. The cylindrical structure 52 is hollow and is installed so as to be able to rotate about the axis extending in the optical axis direction of the laser beam L1 (i.e., about the cylindrical center-axis). Further, a connecting member 53 is disposed so as to connect the opening end face 52a of the cylindrical structure 52 on the lower side (−Y) to the reflecting mirror 54. A cavity $52_{inner}$ of the cylindrical structure 52 functions as an optical path through which a laser beam and its reflected light are transmitted.

The reflecting mirror 54 is positioned so as to tilt with respect to the optical axis of the laser beam L1 passing through the cavity $52_{inner}$ of the cylindrical structure 52 by a predetermined angle (e.g., 45 degrees). Incidentally, the lower side (−Y) corresponds to the second side in one aspect of the present invention, and the upper side (+Y) which is opposite to this lower side (−Y) corresponds to the first side in one aspect of the present invention. Additionally, the above-described predetermined angle may be another angle such as 50 degrees, 40 degrees or 30 degrees, instead of 45 degrees.

Since the rotatable deflection structure 50 is configured as described above, the reflecting mirror 54 equipped with the reflective surface (i.e., deflecting surface) 54a tilts with respect to the optical axis of a laser beam by 45 degrees. Further, by the rotatable deflection structure 50, the reflecting mirror 54 is disposed so as to be able to rotate about the cylindrical center-axis extending in the optical axis of the laser beam L1. Note that configuration of supporting the side surface of the cylindrical structure 52 by the bearings 56 and 58 shown in FIG. 2(b) enables the cylindrical structure 52 to rotate. The term "rotatable" herein means being able to rotate within the range of a predetermined angle and includes a case of being able to fully rotate by 360 degrees.

The laser beam L1 having passed through the cavity $52_{inner}$ of the cylindrical structure 52 is reflected by the reflecting mirror 54 of the rotatable deflection structure 50 toward the horizontal direction X. Then, the reflected light L3 from an object to be detected is reflected by the reflecting mirror 54 toward the upper side (+Y) in the vertical direction Y. The laser beam reflected toward the horizontal direction X is indicated by the reference sign L2 in FIG. 4. The laser beam L2 is outputted toward external space. The reflected light L4 reflected toward the upper side (+Y) in the vertical direction passes through the cavity $52_{inner}$ of the cylindrical structure 52 and is made incident on the optical isolator 40 from the lower side (−Y).

Although description has been given of a case where the reflecting mirror 54 has a flat reflective surface, the reflective surface of the reflecting mirror 54 may be concave. By forming the reflective surface as a concave surface, a configuration of guiding the reflected light L3 from an object to the photodiode 20 can be realized without making the laser radar device more complicated or larger in size. The reflecting mirror 54 corresponds to the "deflecting surface" in one aspect of the present invention.

A motor 70 for driving the rotatable deflection structure 50 is disposed beside the rotatable deflection structure 50. A gear 72 is mounted on the shaft of the motor 70, and a gear belt 74 is provided around the side surface of the cylindrical structure 52 of the rotatable deflection structure 50. The gear 72 and the gear belt 74 mesh with each other, which enables the motor 70 to drive the cylindrical structure 52 to rotate about the cylindrical center-axis.

In the present embodiment, the motor 70 is configured as a stepping motor. Various types of motor can be used for the stepping motor, and fine rotation can be achieved by adopting a stepping motor whose step angle is small. Further, another driving method such as a servomotor other than the stepping motor may be used for the motor 70. For instance, the laser radar device 1 may be equipped with a motor capable of steady rotation so as to output a pulse laser beam in synchronization with the timing at which the reflecting mirror 54 turns to the direction in which ranging is required. In this case, an object existing in a desired direction can be detected.

As shown in FIG. 2(a), the laser diode 10, the photodiode 20, and the motor 70 are electrically connected to the controller 80 by the wiring 92 and are controlled by the controller 80.

Additionally, as shown in FIG. 2 and FIG. 3, the lens 30, the mirror 35, the optical isolator 40, the condenser lens 45, the bearings 56 and 58 for supporting the rotatable deflection structure 50, and the motor 70 are mounted on a frame (i.e., supportive structure) 60. The reference signs 62 and 64 in FIG. 2 indicate fixing structures of the frame 60 for fixing the bearings 56 and 58. Note that the outline of the frame 60 in FIG. 2(b) is indicated by a bold line in order to distinguish it from other components.

Further, the laser diode 10, the photodiode 20, the controller 80, and the respective components mounted on the frame 60 are housed in the housing 90. The reflecting mirror 54 and the connecting member 53 of the rotatable deflection structure 50 protrude from the opening of the housing 90, and are housed in a cap 94 molded of a light-transmissive resin material which transmits a laser beam. The housing 90 and the cap 94 provide functions of dust prevention and shock protection.

Next, the operation of the laser radar device 1 will be described. As shown in FIG. 4, when pulse electric current is supplied from the controller 80 to the laser diode 10 in the laser radar device 1, the laser diode 10 generates the pulse laser beam L0 at time intervals according to the pulse width of the pulse electric current. This laser beam L0 is projected as diffused light having a divergence angle of a certain degree, and is converted into parallel light by being transmitted through the lens 30. The laser beam L0 transmitted through the lens 30 is reflected as the laser beam L1 downward (−Y) in the vertical direction Y by the mirror 35. This laser beam L1 is transmitted through the optical isolator 40, then transmitted through the cavity $52_{inner}$ of the cylindrical structure 52 of the rotatable deflection structure 50, and then made incident on the reflecting mirror 54 of the rotatable deflection structure 50. The laser beam L1 is reflected as parallel light by the reflecting mirror 54, and then this parallel light is radiated as the laser beam L2 toward external space.

The controller 80 drives the motor 70 so as to cause the cylindrical structure 52 of the rotatable deflection structure 50 to rotate by 360 degrees, at the timing of causing the laser diode 10 to generate the laser beam. Thus, the reflecting mirror 54 which is disposed so as to tile with respect the optical axis of the laser beam L1 by 45 degrees rotates about this optical axis by 360 degrees. As the result, the laser beam L2 outputted as parallel light from the reflecting mirror 54 is horizontally radiated to external space over all the azimuths of 360 degrees.

When an object exists in external space, the laser beam L2 is reflected by this object, and then a part of the reflected light reflected by this object is made incident on the reflecting mirror 54 again as the reflected light L3. This reflected light L3 is reflected by the reflecting mirror 54 upward (+Y) in the vertical direction Y, and then transmitted through the cavity $52_{inner}$ of the cylindrical structure 52 of the rotatable deflection structure 50 as the reflected light L4. This reflected light L4 is made incident on the optical isolator 40.

The photodiode 20 outputs an electric signal according to the received reflected light L5 (e.g., a voltage value according to the received reflected light L5). In such a configuration, the distance to the detected object can be determined by measuring the time interval between the timing of outputting the laser beam L0 from the laser diode 10 and the timing of detecting its reflected light L5 by the photodiode 20. Additionally, the azimuth of the detected object can be determined based on the rotational position of the reflecting mirror 54 at the timing when the reflected light L5 is detected by the photodiode 20.

In the laser radar device 1 of the present embodiment as described above, the reflecting mirror 54 is disposed at the opening end face 52a on the lower side (−Y) of the rotatably mounted cylindrical structure 52 and the motor 70 disposed on the upper side (+Y) drives this cylindrical structure 52 to rotate. Hence, even if the laser beam L2 is outputted so as to cover all the azimuths of 360 degrees by rotating the cylindrical structure 52 by 360 degrees, no part of the irradiation range of the laser beam L2 is interrupted by the wiring 92 connecting the motor 70 to the controller 80 and/or the frame 60 housing the rotatable deflection structure 50. Thus, the laser radar device 1 of the present embodiment can scan its surrounding over all the azimuths of 360 degrees.

In the conventional technology, it is required to use plural laser radar devices for realizing a scan over all the azimuths of 360 degrees. However, according to the present embodiment, a scan over all the azimuths of 360 degrees can be realized by only one laser radar device 1, and thus security performance is significantly improved. In other words, according to the laser radar device 1 of the present embodiment, security performance is significantly improved by a simple configuration.

Additionally, the cylindrical structure 52 has a fixed height H in the direction of the optical axis Y in the present embodiment. Hence, internal scattered light generated inside the laser radar device 1 is repeatedly reflected on the wall of the cavity $52_{inner}$ of the cylindrical structure 52. In other words, intensity of the internal scattered light is expected to attenuate by the repetitive reflection inside the cavity $52_{inner}$. Thus, it can be expected that the amount of the internal scattered light made incident on the photodiode 20 is decreased and noise resistance of the laser radar device 1 is improved. The wall of the cavity $52_{inner}$ may be coated with an antireflection coating. Additionally or alternatively, an antireflection material may be attached on the wall of the cavity $52_{inner}$.

Second Embodiment

The laser radar device 101 according to the second embodiment of the present invention will be described with reference to FIG. 5 to FIG. 7.

Figure 5:
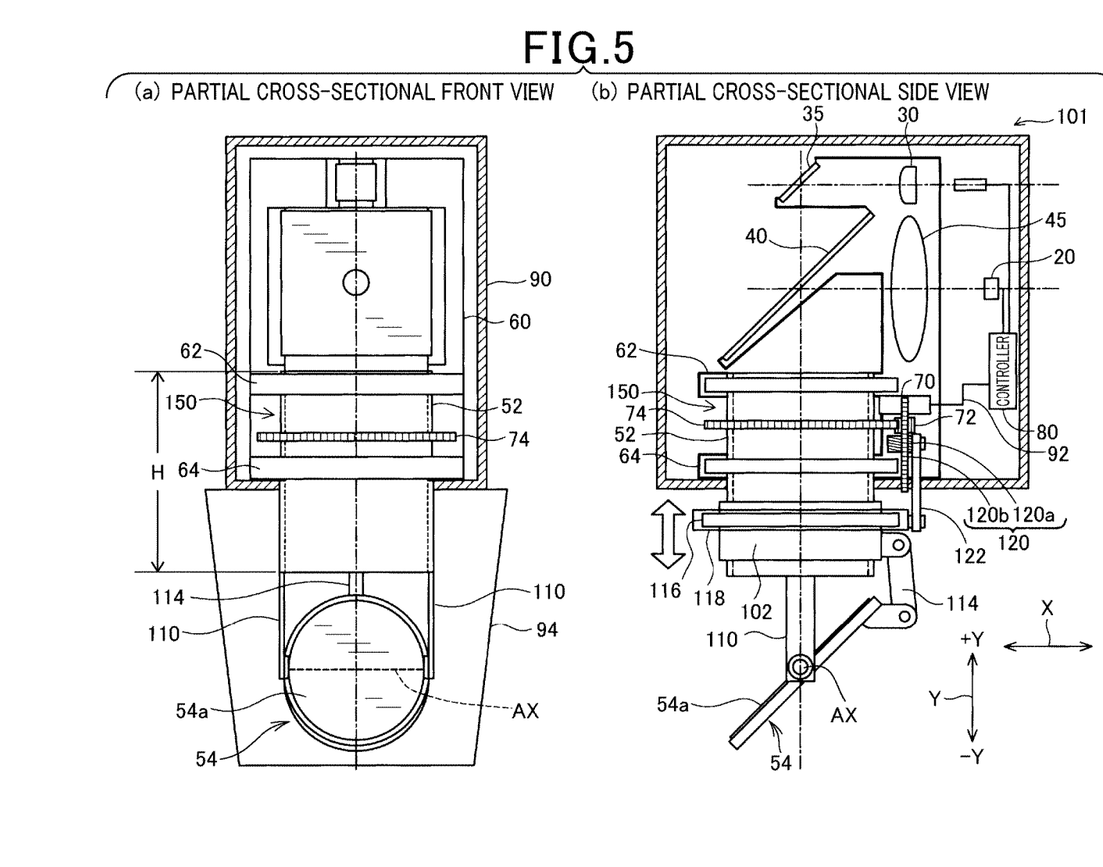
FIG. 5 is a partial cross-sectional diagram illustrating the laser radar device according to the second embodiment of the present invention.

FIG. 5(a) is a partial cross-sectional front view and FIG. 5(b) is a partial cross-sectional side view of the laser radar device 101.

Figure 6:
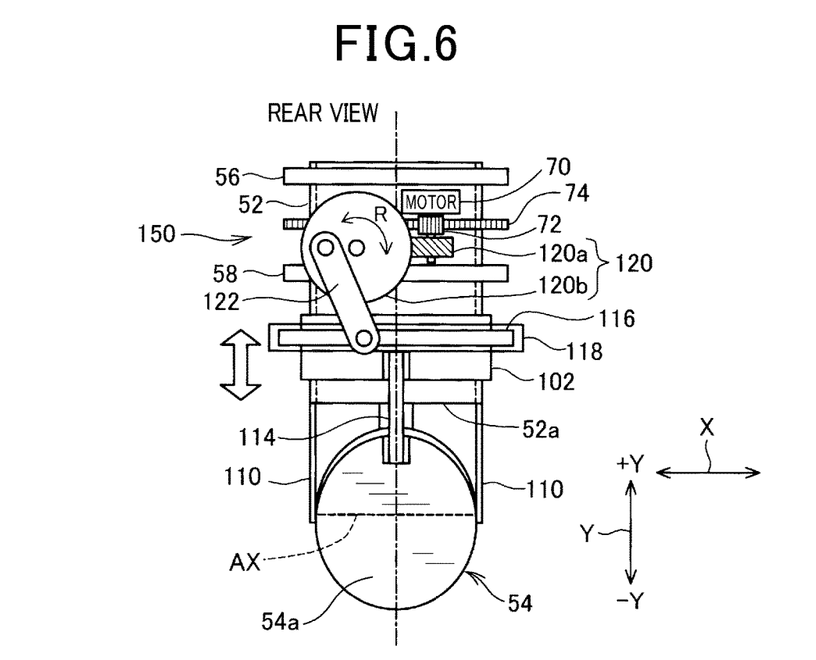
FIG. 6 is a rear view illustrating the laser radar device according to the second embodiment of the present invention.

FIG. 6 is a rear view illustrating a rotatable deflection structure and its peripheral of the laser radar device 101.

The laser radar device 101 is different from the laser radar device 1 of the first embodiment in that an output direction of a laser beam outputted to external space is not limited to all the horizontal directions but also can be tilted upward or downward from the horizontal plane. That is, the laser radar device 101 can tilt an output direction of a laser beam in the elevating-angle direction.

FIG. 7(a) and FIG. 7(b) respectively illustrate a front view and a side view of the rotatable deflection structure and its peripheral of the laser radar device 101 when the elevating-angle direction of an output direction of a laser beam is changed from that shown in FIG. 5 and FIG. 6.

The laser radar device 101 of the second embodiment includes a configuration of changing an output direction of a laser beam in the elevating-angle direction in addition to almost all the components of the laser radar device 1 of the first embodiment. As to each component of the laser radar device 101 of the second embodiment, the same reference sign is assigned in FIG. 5 to FIG. 7 to the same component as that of the laser radar device 1 of the first embodiment shown in FIG. 2 and FIG. 3. Accordingly, duplicate description is omitted.

Figure 7:
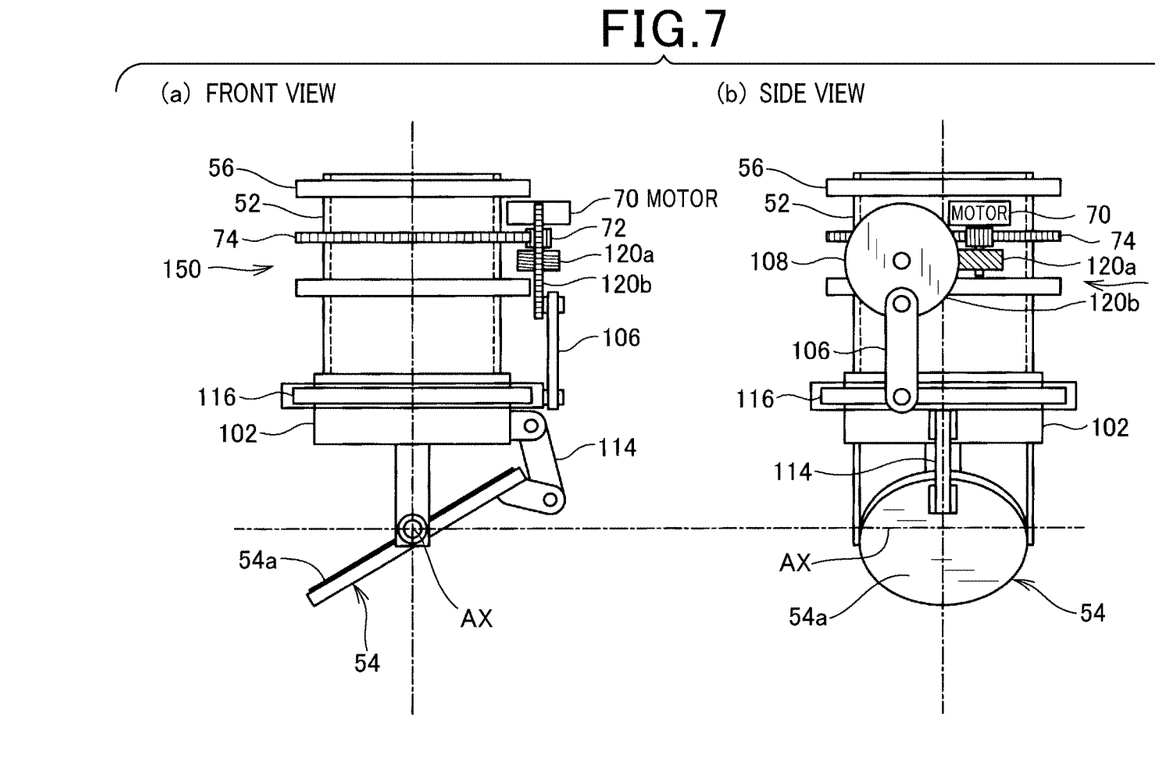
FIG. 7 is a schematic diagram illustrating a rotatable deflection structure and its peripheral in the laser radar device of the second embodiment when an elevating-angle direction of an output direction of a laser beam is changed.

A shown in FIG. 5 to FIG. 7, the laser radar device 101 is provided with a pair of long plate-shaped members 110 at the opening end face 52a on the lower side (−Y) of the cylindrical structure 52 of the rotatable deflection structure 150. The pair of plate-shaped members 110 are configurations for changing an output direction of a laser beam in the elevating-angle direction. The reflecting mirror 54 is axially supported by the two plate-shaped members 110 therebetween, and this supporting axis direction matches the horizontal direction X. This structure enables the reflecting mirror 54 to rotate about the axis AX extending along the horizontal direction X.

At the edge region of the reflecting mirror 54 in the direction perpendicular to the rotational axis AX, an arm 114 is connected thereto. The edge of the arm 114 opposite to the side of the reflecting mirror 54 is connected to a sliding cylinder 102 which is mounted around the side surface of the cylindrical structure 52 so as to be able to slide upward and downward. More particularly, a bearing 116 is mounted around the side surface of the sliding cylinder 102 and a flange 118 is fixed around the outer periphery of the bearing 116, which enables the sliding cylinder 102 to slide upward and downward.

As described in the first embodiment, the drive force of the motor 70 is transmitted as torque (i.e., rotation force) around the cylindrical center-axis to the cylindrical structure 52 via the gear 72 the gear belt 74. In the second embodiment, the drive force of the motor 70 is further transmitted as force of moving the sliding cylinder 102 upward and downward (i.e., in the vertical direction Y) to the flange 118 via the worm gear 120 and a rod 122.

The worm gear 120 is a gear system in which a worm 120a and a worm wheel 120b are combined. The worm 120a is made by spirally and continuously forming a cog on a cylindrical structure. The worm wheel 120b is made by forming a cog on a side surface of a disc so as to mesh with the worm 120a. In FIG. 6 and FIG. 7(*b*), the cog of the worm wheel 120b is not illustrated for avoiding complication. The worm 120a is connected to the shaft of the motor 70, and the worm wheel 120b is connected to the rod 122. The end of the rod 122 opposite to the side of the worm wheel 120b is connected to the flange 118.

Since the torque around the vertical direction Y by the motor 70 is converted into the torque around the horizontal direction X by the worm gear 120, the worm wheel 120b rotates in the direction R shown in FIG. 6. Further, the worm wheel 120b and the rod 122 are rotatably connected with each other by a shaft, and the rod 122 and the flange 118 are also rotatably connected with each other by a shaft. Accordingly, the torque of the worm wheel 120b is transmitted as force in the up-and-down direction to the flange 118 via the rod 122. When the flange 118 rotatably fixed to the side surface of the sliding cylinder 102 via the bearing 116 receives force in the up-and-down direction, the sliding cylinder 102 is caused to move in the up-and-down direction together with the flange 118. Thereby, the reflecting mirror 54 is caused to rotate about the axis AX by the arm 114 as described above.

Next, the operation of the laser radar device 101 will be described. In a manner similar to the laser radar device 1 of the first embodiment, the laser radar device 101 can radiate a laser beam as parallel light so as to cover 360 degrees around the rotational axis along the vertical direction Y. Furthermore, the laser radar device 101 can change an output direction of a laser beam in the elevating-angle direction while scanning its surrounding over all the azimuths of 360 degrees.

For instance, the laser radar device 101 can change the elevating-angle direction from +30 degrees to −30 degrees in one period of scanning its surrounding over all the azimuths of 360 degrees. FIG. 7(*a*) and FIG. 7(*b*) respectively illustrate a front view and a side view of the laser radar device 101 when the elevating-angle direction is +30 degrees. The variable range of an output direction of a laser beam in the elevating-angle direction and its switching speed are not limited to the above-described aspect but able to be arbitrarily changed.

Hence, the laser radar device 101 configured as described above can radiate a laser beam so as to cover all the azimuths of 360 degrees, and can change an irradiation direction of a laser beam in the elevating-angle direction. Accordingly, a wide irradiation range in the up-and-down direction is realized, and thus its security performance can be further improved.

Note that the present invention is not limited to the above described embodiments or modifications thereof. The novel methods and systems described herein may be embodied in a variety of other forms without departing from the spirit of the present invention, and can be further exemplified as the following modifications, for instance.

[First Modification]

In the first and second embodiments, the gear belt 74 is mounted around the outer side surface of the cylindrical structure 52 of the rotatable deflection structure 150 so as to transmit the driving force of the motor 70. Instead of such a configuration, a gear belt may be mounted around internal side surface of the cylindrical structure 52 so that the gear 72 to be connected to the motor 70 is provided inside the cylindrical structure. Additionally, the cylindrical structure 52 to which the reflecting mirror 54 is fixed as a deflecting surface may be in the form of another shape except a cylinder. In other words, any configuration in which a deflecting surface is provided so as to be rotatable around a predetermined axis can be used for the rotatable deflector.

[Second Modification]

Although the torque of the motor 70 around the vertical direction Y is converted by the worm gear 120 into the torque around the horizontal direction X in the second embodiment, a configuration of converting the torque is not limited to the worm gear 120. Any configuration by which the torque of the motor 70 is perpendicularly converted can be used instead of the worm gear 120.

[Third Modification]

The laser radar device (1 or 101) is installed so that an output direction of a laser beam becomes horizontal in the first embodiment or can be changed in the elevating-angle direction with reference to the horizontal direction in the second embodiment. However, a laser radar device of the present invention is not required to be installed in the above-described condition and may be installed so as to tilt from the horizontal direction.

Note that the components of the above-described embodiments and the respective modifications excluding the components recited in each independent claim are additional components and can be arbitrarily omitted.

REFERENCE SIGNS LIST

1 . . . laser radar device
10 . . . laser diode
20 . . . photodiode
30 . . . lens
35 . . . mirror
40 . . . optical isolator
45 . . . condenser lens
50 . . . rotatable deflection structure
52 . . . cylindrical structure
52a . . . opening end face
52$_{inner}$ . . . cavity (optical path)
53 . . . connecting member
54 . . . reflecting mirror (deflector having a deflecting surface)
54a . . . reflective surface (deflecting surface)
56, 58 . . . bearing
60 . . . frame
62, 64 . . . bearing fixing-structure
70 . . . motor
72 . . . gear
74 . . . gear belt
80 . . . controller
90 . . . housing
92 . . . wiring
94 . . . cap
101 . . . laser radar device
102 . . . sliding cylinder
110 . . . plate-shaped member
114 . . . arm
116 . . . bearing
118 . . . flange
120 . . . worm gear
120a . . . worm
120b . . . worm wheel
122 . . . rod
150 . . . rotatable deflection structure
X . . . horizontal direction Y . . . vertical direction
L0, L1, L2 . . . laser beam
L3, L4, L5 . . . laser light (reflected light)

What is claimed is:

1. A laser radar device comprising:
a laser-beam generator configured to generate a laser beam;
a laser-beam detector configured to detect reflected light of the laser beam reflected by an object when the laser beam is outputted from the laser-beam generator;
a transmission/reflection structure configured to be disposed on an optical axis of the laser beam so as to tilt with respect to the optical axis of the laser beam by a predetermined angle, transmit the laser beam, and reflect the reflected light toward the laser-beam detector;
a rotatable deflector configured to
include an optical path through which the laser beam and the reflected light are transmitted, and a deflecting surface rotatably disposed around a center axis extending along the optical axis of the laser beam having been transmitted,
deflect the laser beam, which is made incident on the deflecting surface after being transmitted through the optical path, toward an external space, and
deflect the reflected light, which is returned to the deflecting surface from the external space, toward the transmission/reflection structure through the optical path; and
a driver configured to drive the rotatable deflector, wherein
the driver is disposed at a position closer to a first side in a direction of the center axis than the deflecting surface, the first side being a side where the laser-beam generator exists, and a second side being a side opposite to the first side in the direction of the center axis,
the rotatable deflector includes (i) a cylindrical structure, whose inside is formed as a hollow cavity functioning as the optical path, which includes a deflector equipped with the deflecting surface, and which is disposed in such a manner that a cylindrical axis of the cylindrical structure matches the optical axis of the laser beam and the deflecting surface is positioned at a cylindrical opening on the second side of the cylindrical structure, (ii) a transmitter configured to be disposed around a side surface of the cylindrical structure and to transmit driving force of the driver to the cylindrical structure, and (iii) at least two bearings attached to the side surface of the cylindrical structure in a direction of the center axis,
the laser radar device further comprises at least two fixing portions which fix the at least two bearings, and
the transmitter is disposed between the at least two bearings in the direction along the center axis.

2. The laser radar device according to claim 1, wherein the at least two bearings consist of two bearings respectively attached to the side surface of the cylindrical structure such that the transmitter is disposed between the two bearings in the direction of the center axis, and the at least two fixing portions consist of two fixing portions.

3. The laser radar device according to claim 2,
wherein the rotatable deflector is disposed in such a manner that the deflecting surface can rotate not only around the center axis but also in an elevating-angle direction with reference to a plane perpendicular to the center axis; and
the driver is configured to drive the rotatable deflector to not only rotate around the center axis but also rotate in the elevating-angle direction.

4. The laser radar device according to claim 3, wherein
the transmitter includes a first transmitter configured to be disposed around the side surface of the cylindrical structure and to transmit the driving force of the driver as torque around the center axis to the cylindrical structure;
the rotatable deflector includes a rotational-direction converter configured to convert the driving force of the driver into torque around an axis perpendicular to the cylindrical axis in conjunction with the first transmitter; and
the transmitter includes a second transmitter configured to convert torque converted by the rotational-direction converter into force in the direction of the center axis and to transmit the force in the direction of the center axis to the deflecting surface.

5. The laser radar device according to claim 3, further comprising a controller configured to be electrically connected to the laser-beam generator, the laser-beam detector, and the driver by wiring and to control operations of the laser-beam generator, the laser-beam detector, and the driver.

6. The laser radar device according to claim 1, further comprising a controller configured to be electrically connected to the laser-beam generator, the laser-beam detector, and the driver by wiring and to control operations of the laser-beam generator, the laser-beam detector, and the driver.

7. The laser radar device according to claim 4, further comprising a controller configured to be electrically connected to the laser-beam generator, the laser-beam detector, and the driver by wiring and to control operations of the laser-beam generator, the laser-beam detector, and the driver.

8. The laser radar device according to claim 2, further comprising a controller configured to be electrically connected to the laser-beam generator, the laser-beam detector, and the driver by wiring and to control operations of the laser-beam generator, the laser-beam detector, and the driver.

9. A laser radar device comprising:
a laser-beam generator configured to generate a laser beam;
a laser-beam detector configured to detect reflected light of the laser beam reflected by an object when the laser beam is outputted from the laser-beam generator;
a transmission/reflection structure configured to be disposed on an optical axis of the laser beam so as to tilt with respect to the optical axis of the laser beam by a predetermined angle, transmit the laser beam, and reflect the reflected light toward the laser-beam detector;
a rotatable deflector configured to
include an optical path through which the laser beam and the reflected light are transmitted, and a deflecting surface rotatably disposed around a center axis extending along the optical axis of the laser beam having been transmitted,
deflect the laser beam, which is made incident on the deflecting surface after being transmitted through the optical path, toward an external space, and deflect the reflected light, which is returned to the deflecting surface from the external space, toward the transmission/reflection structure through the optical path; and
a driver configured to drive the rotatable deflector,
wherein the driver is disposed at a position closer to a first side in a direction of the center axis than the deflecting surface, the first side being a side where the laser-beam generator exists, and a second side being a side opposite to the first side in the direction of the center axis,
wherein the rotatable deflector is disposed in such a manner that the deflecting surface can rotate not only around the center axis but also in an elevating-angle direction with reference to a plane perpendicular to the center axis; and
the driver is configured to drive the rotatable deflector to not only rotate around the center axis but also rotate in the elevating-angle direction,
wherein the rotatable deflector comprises:
   a cylindrical structure, whose inside is formed as a hollow cavity functioning as the optical path, which includes a deflector equipped with the deflecting surface, and which is disposed in such a manner that a cylindrical axis of the cylindrical structure matches the optical axis of the laser beam and the deflecting surface is positioned at a cylindrical opening on the second side of the cylindrical structure;
a first transmitter configured to be disposed around a side surface of the cylindrical structure and to transmit driving force of the driver as torque around the center axis to the cylindrical structure;
a rotational-direction converter configured to convert the driving force of the driver into torque around an axis perpendicular to the cylindrical axis in conjunction with the first transmitter; and
a second transmitter configured to convert torque converted by the rotational-direction converter into force in the direction of the center axis and to transmit the force in the direction of the center axis to the deflecting surface.

\* \* \* \* \*